US011363312B2

(12) United States Patent
Birrer et al.

(10) Patent No.: US 11,363,312 B2
(45) Date of Patent: *Jun. 14, 2022

(54) ADAPTIVE BIT-RATE METHODS FOR LIVE BROADCASTING

(71) Applicant: Phenix Real Time Solutions, Inc., Chicago, IL (US)

(72) Inventors: Stefan Birrer, Chicago, IL (US); Fabián Bustamante, Evanston, IL (US)

(73) Assignee: Phenix Real Time Solutions, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,763

(22) Filed: Apr. 21, 2021

(65) Prior Publication Data

US 2021/0243481 A1 Aug. 5, 2021

Related U.S. Application Data

(63) Continuation of application No. 16/395,858, filed on Apr. 26, 2019, now Pat. No. 11,019,368.

(60) Provisional application No. 62/663,182, filed on Apr. 26, 2018.

(51) Int. Cl.
*H04N 21/2187* (2011.01)
*H04N 21/2662* (2011.01)
*H04N 21/234* (2011.01)

(52) U.S. Cl.
CPC ....... *H04N 21/2187* (2013.01); *H04N 21/234* (2013.01); *H04N 21/2662* (2013.01)

(58) Field of Classification Search
CPC ............ H04N 21/2187; H04N 21/234; H04N 21/2662; H04N 21/44209; H04N 21/44227; H04N 21/44245; H04N 21/238; H04N 21/2385; H04N 21/2402; H04N 21/442
See application file for complete search history.

(56) References Cited

U.S. PATENT DOCUMENTS

2007/0162611 A1 7/2007 Yu et al.
2016/0337675 A1* 11/2016 Mutton ................. H04N 19/40
2016/0381367 A1* 12/2016 Good ..................... H04N 21/84
375/240.07

(Continued)

FOREIGN PATENT DOCUMENTS

KR 20170118759 A 10/2017

OTHER PUBLICATIONS

Int'l Search Report and Written Opinion dated Jul. 9, 2019 for Int'l Application No. PCT/US19/29327.

*Primary Examiner* — Yassin Alata
(74) *Attorney, Agent, or Firm* — Perkins Coie LLP; Alberto Araiza; Kristen Schunter

(57) ABSTRACT

The following describes techniques to maintain continuity of a live media stream. A media stream includes a first distribution layer with a first set of key frames and a set of delta frames succeeding key frames in the first set of key frames. The media stream also includes a second distribution layer including a second set of key frames, where the second set of key frames contains fewer key frames than the first set of key frames. Using the first and second distribution layers, a client device may subscribe to the media stream with a minimized start-up time and optimized quality of experience among varying complexity of the media content and dynamic network conditions.

20 Claims, 16 Drawing Sheets

(56) References Cited

U.S. PATENT DOCUMENTS

2017/0238055 A1 8/2017 Chang et al.
2018/0359499 A1* 12/2018 Mavlankar ....... H04N 21/26275
2019/0200048 A1 6/2019 Pio

* cited by examiner

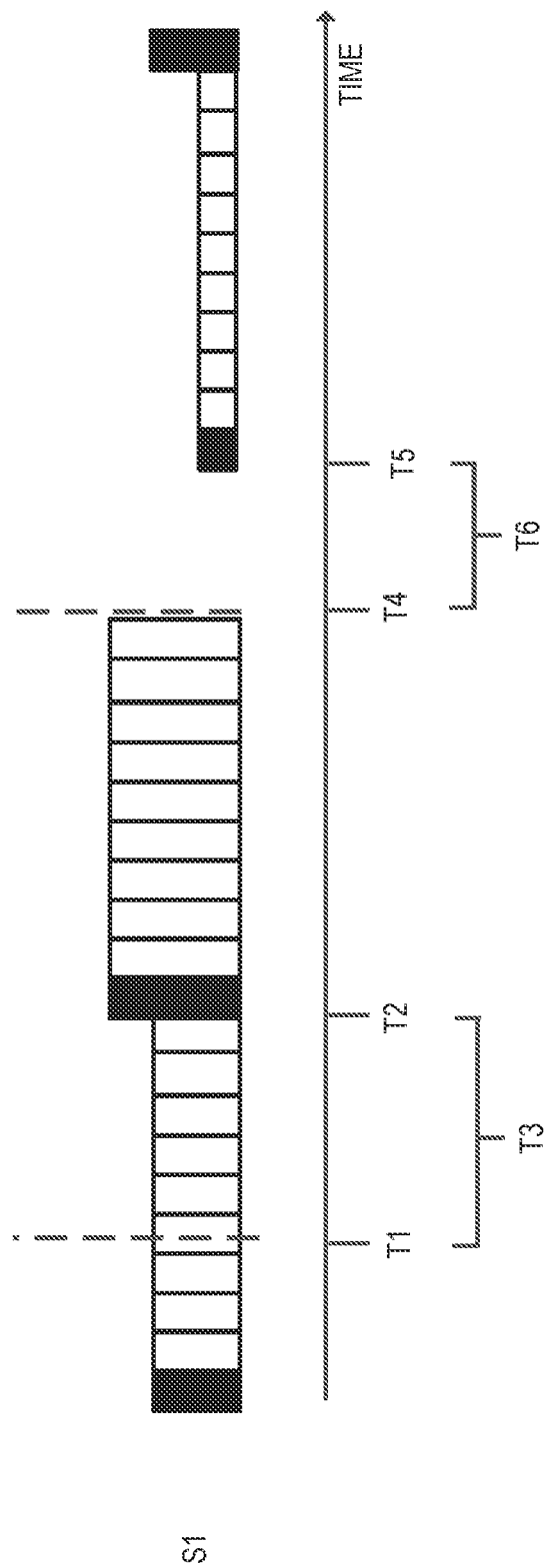

ADAPTIVE BIT-RATE METHODS FOR LIVE BROADCASTING

CROSS-REFERENCE TO RELATED APPLICATION

This application is a continuation application of U.S. patent application Ser. No. 16/395,858 filed Apr. 26, 2019 and titled "ADAPTIVE BIT-RATE METHODS FOR LIVE BROADCASTING," which claims priority to U.S. provisional patent application Ser. No. 62/663,182 filed Apr. 26, 2018 and titled "ADAPTIVE BIT-RATE METHODS FOR LIVE BROADCASTING," both of which are incorporated herein in its entirety by this reference thereto.

TECHNICAL FIELD

The disclosed teachings relate to live media streaming over packet switched networks and, more specifically, to adaptive-rate selection for live streaming media content over such networks.

BACKGROUND

Streaming video content over the Internet is quickly gaining popularity as a way to view video content. One such form of streaming video content is live video content, such as live-action sports, video calls between devices, live news reports, etc. An electronic device (e.g., smartphone, computer, tablet) can access (or "subscribe to") a video stream over the Internet.

An important metric for streaming video content over the Internet is a quality level indicating the quality of the streamed video. The quality level may be dictated by a selected bit-rate for transmitting video content over the Internet. A higher bit-rate may indicate that a greater amount of information in the video content is encoded and a more accurate reproduction of the original video content. In contrast, a lower bit-rate may have a lesser amount of encoded information and be a less accurate reproduction of the original video content.

A bit-rate for transmitting video content may be selected by a client device based on several factors, such as the network conditions of the client device, a desired start-up latency (i.e., the delay experienced when first initializing the video playback), and a tolerance to glitching/rebuffering (i.e., when video playback stops due to missing video content data). In many cases, start-up latency or re-buffering while streaming video content is undesirable. Accordingly, it may be desirable to minimize or eliminate start-up latency and re-buffering of the streaming video content while streaming a higher bit-rate video stream.

SUMMARY

The present disclosure relates to techniques to maintain continuity of a live media stream. A media stream may include a first distribution layer at a first bit-rate with at least one key frame at a first time relative to a time domain and a set of delta frames succeeding the first key frame. The media stream may also include a number of additional distribution layers, with each distribution layer including at least one key frame shifted in time relative to the other layers at a set of delta frames succeeding the key frame.

A streaming server may obtain the first distribution layer of the media stream. The streaming server may generate an additional distribution layer of the media stream with a key frame shifted in time relative to the first time. The generation of the additional distribution layers may be based on identifying an indicator representing a request to generate the additional distribution layer. The media stream may be sent to at least one client device.

A client device may subscribe to one of the first distribution layer or an additional distribution layer of the media stream. A device may subscribe to the additional distribution layer of the media stream at the second time to minimize a start-up time and optimize a quality of experience among varying complexity of the media content and dynamic network conditions.

Other aspects of the technique will be apparent from the accompanying Figures and Detailed Description.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7B illustrates an adaptive bit-rate streaming for live broadcasting in dynamic network conditions, in accordance with various embodiments.

Figure 1:
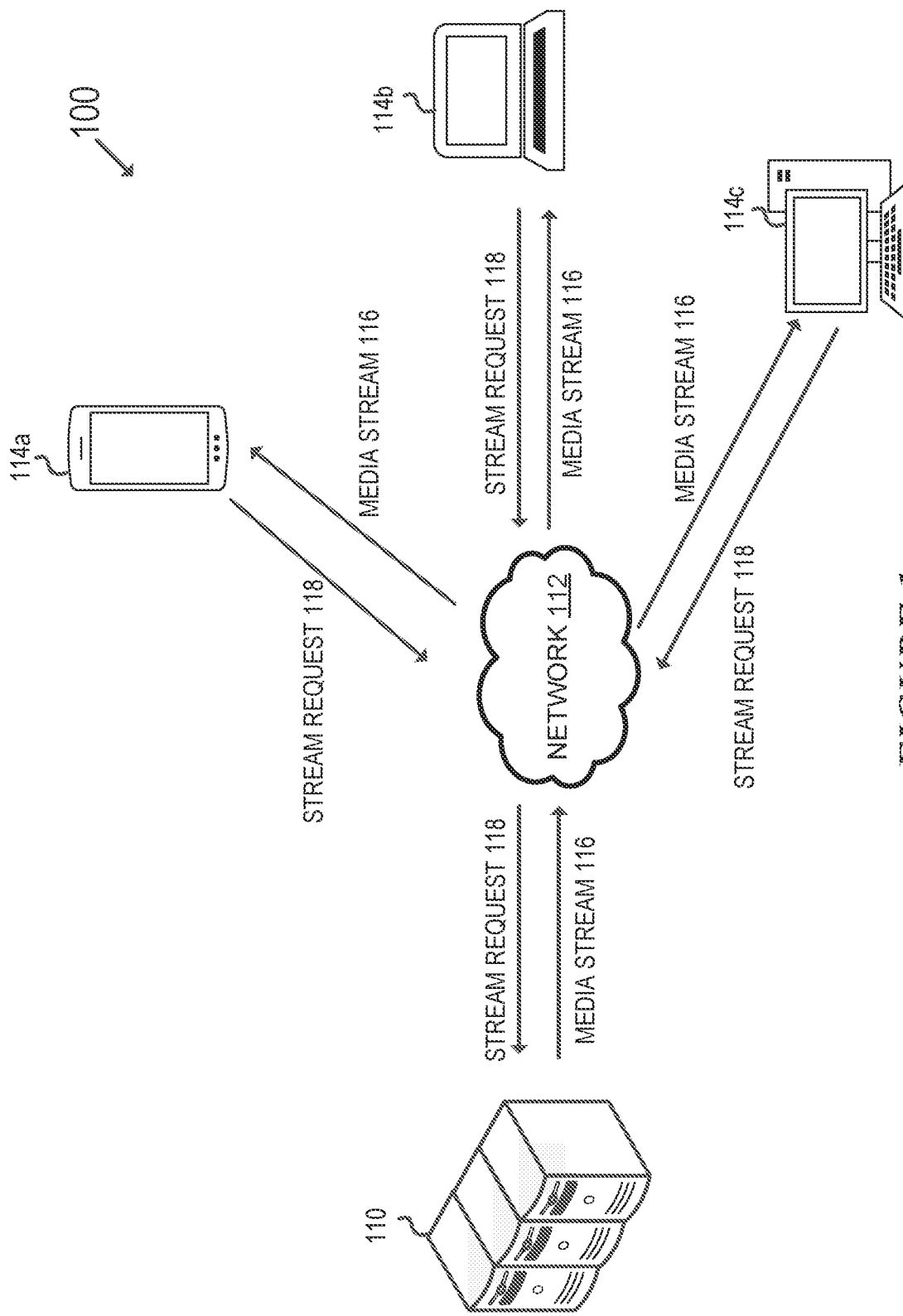
FIG. 1 illustrates a system to stream live media content to a plurality of client devices, in accordance with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to examine video content generated by an electronic device, identify elements included in the video content, apply a classification model to determine an appropriate action, and perform the appropriate action.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

The term "live media stream" refers broadly to broadcasting an event on a network as it happens. This may include broadcasting content that is generated by a source device, transmitted through a network, and rendered by a receiving device with a latency/delay that is unperceivable by a user of the receiving device, which also may be referred to as "near real-time." Examples of such a latency that is unperceivable by a user of a device can include 100 ms, 300 ms, 500 ms, etc. Accordingly, users of client devices in a broadcast group can interact with or respond to the live media stream in near real-time (i.e., with a delay that is unperceivable to the users of the client devices in the broadcast group).

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Overview

Streaming media content over packet switched networks, such as the Internet, is quickly gaining popularity as a way to consume various media (e.g., video, audio). Electronic devices (e.g., smartphones, computers, tablets) can connect to a network (e.g., the Internet) and subscribe to various video and audio data streams. For example, multiple electronic devices (or "client devices") may subscribe to a live stream of a video call generated by an originating device. As another example, client devices may subscribe a live stream of a sporting event. All client devices subscribing to a media stream may be collectively referred to as a "broadcasting group."

With an increase in popularity of streaming media content also comes an increase in bandwidth and computational resource demand from users to deliver high quality video and audio streaming over the Internet. The quality of live media streams may be at least partially based on a start-up latency of the video playback, as a delay experienced when initializing the video playback may lower the quality of the user experience. Additionally, the quality of live media streams may be based on the re-buffering or glitching of the video playback, as this may lower the quality of the user experience as well.

To provide streaming media content to various client devices, a streaming device may generate a media stream and transmit the media stream to the client devices over a network. The media stream may include at least one key frame (i.e., data that can be encoded by a client device to render a complete frame) and a number of predictive (or "delta") frames (i.e., data representing the differences from the key frame). The media stream may include a bit-rate representing a number of bits representing the frame of video, where an increased bit-rate represents a greater definition of the associated video.

In some embodiments, a new client device may subscribe to the streaming media content. For a new client device to subscribe to streaming media content, the client device may first process a key frame to render a frame of video. Once rendered, the new client device can process the subsequent prediction frames to render and output a series of frames comprising the video. However, a series of key frames may be disposed along a media stream at various times. If a new client device subscribes to a media stream at a time that is between key frames, the new client device may be unable to process the media stream and render a video until the next key frame arrives. This may result in a start-up latency for the new client device.

Similarly, in some embodiments, network conditions associated with a client device may change. For example, the bandwidth for a client device may drop, and the client device may be unable to process the media stream at a present bit-rate. This may result in glitching/interruption of the video, as the client device may be unable to properly process and render the video. As a second example, the client device may be capable of processing a media stream at a higher bit-rate than the present bit-rate. However, the client device may not be able to subscribe to a greater bit-rate stream until a new key frame for that greater bit-rate stream arrives, leading to a time duration of underutilized bandwidth and lower video quality. Client devices that experience a change in network conditions may subscribe to an alternative stream of the streaming media content that includes a different bit-rate. However, like with new subscribers, the client device may have to wait until a new key frame to render the streaming media content at the different bit-rate.

Accordingly, to optimize the quality of live media streaming, various streaming techniques may be employed to minimize or eliminate a start-up latency and rebuffering/glitching. Additionally, optimizing the quality of live media streaming may include selecting a quality level to encode media content such that it can be transferred and reconstructed uninterrupted while preserving its quality in the context of dynamic or heterogeneous network conditions.

The present disclosure relates to utilizing adaptive bit-rate techniques and dynamically generating distribution layers of a media stream for live media streaming. An encoded media stream may be generated with one or more alternative streams (or "distributed layers") with key frames that are shifted with respect to time to lower the start-up latency for client devices to process and render the media being streamed. Distributed layers of the encoded media stream may be dynamically generated for client devices based on determining that a new client device subscribes to the media stream or if a client device experiences a change in network conditions. This may reduce a start-up time for client devices subscribing to an existing stream of media data and increase the quality of the streamed media content leading to increased user experience for all client devices included in a broadcasting group.

FIG. 1 illustrates a system 100 to stream video content to a plurality of client devices 114a-c, in accordance with various embodiments. The system 100 may include one or more streaming servers 110 configured to encode and stream media content over a network 112, such as the Internet. In some embodiments, the streaming servers 110 may be referred to as a "network-accessible server system 110." The streaming servers 110 may receive media data from an external node (e.g., a client device, external server, a video camera). The streaming server 110 may encode and forward the media data to client devices 114a-c in a broadcast group.

In some embodiments, the media data may include a live video stream. As an example, the live video stream may be generated by an external node, forwarded through a network by a streaming server 110, and rendered by a client device 114a-c within a time duration that is unperceivable by a user of a client device 114a-c. In some embodiments, the live video may include video that is near real-time. The live video may be transmitted to client devices included in the broadcast group such that users viewing the live video may interact with the live video and react to the live video.

As an example, smartphone 114a may generate and transmit a live video (e.g., video capturing gameplay, video capturing the user's movement) to streaming server 110. Streaming server 110 can encode the received live video and transmit the encoded video to the other client devices in the broadcast group (e.g., laptop computer 114b, computer 114c). In this example, the other client devices in the broadcast group may receive the encoded live video with a time delay that is unperceivable by a user (e.g., under 300 milliseconds) with minimal buffering.

Furthering the above example, laptop computer 114b can receive the live video and generate a second live video. The second live video may be transmitted to the streaming server 110, where the streaming server 110 encodes and transmits the second live video to the other client devices in the broadcast group (smartphone 114a, computer 114c). In this example, devices included in the broadcast group can interactively communicate via the live video stream with a delay/latency that is unperceivable by users of the devices 114a-c.

The streaming servers 110 may transmit the encoded media stream (e.g., media stream 116) to a client devices 114a-c, which may be collectively referred to as broadcast group 114a-c. In some embodiments, the streaming server 110 may transmit the encoded media stream 116 to a client device 114a-c based on receiving a stream request 118 from the client device 114a-c. A stream request 118 may indicate that a user of a client device 114a-c has requested to subscribe to the encoded media stream 116.

For example, a user of laptop computer 114b can subscribe to a live video stream of a sporting event by transmitting a stream request to the streaming servers 110 over the network 112. Upon receipt of the streaming request, the streaming servers 110 can transmit the encoded video content to laptop computer 114b. The laptop computer 114b can then decode the encoded video data and output the live video stream of the sporting event on a display.

Figure 2:
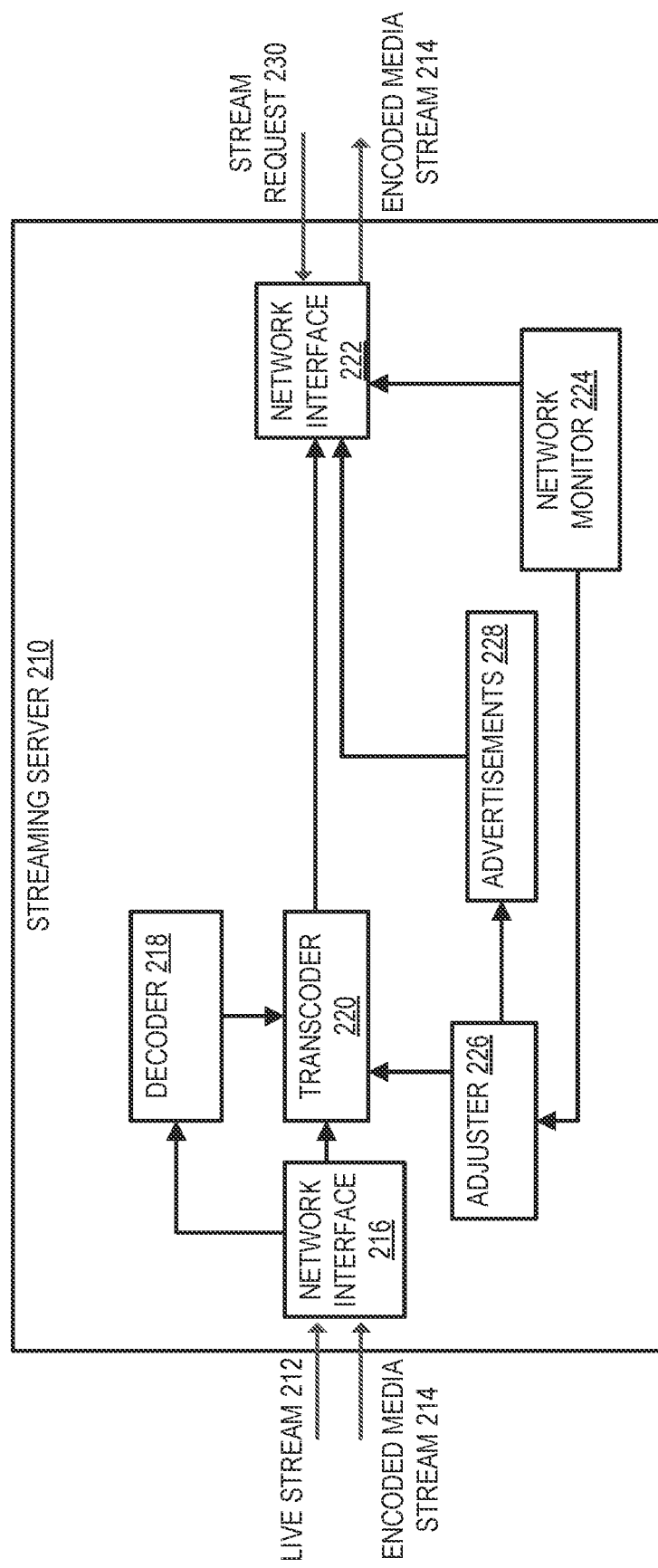
FIG. 2 illustrates an architecture of a streaming server, in accordance with various embodiments.

FIG. 2 illustrates an architecture of a streaming server 210, in accordance with various embodiments. Streaming server 210 may include one or more electronic devices configured to encode and transmit an encoded media stream to one or more client devices over a network. In some embodiments, the streaming server 210 is part of a series of interconnected streaming servers configured to transmit data between the servers.

As noted above, the streaming server 210 may receive a live stream 212 from an external device (e.g., video camera, external server, etc.). The streaming server 210 may receive the live media content at a network interface 216. The network interface 216 may interface with an external device via a suitable wired and/or wireless communication protocol.

In some embodiments, the network interface 216 receives an encoded stream of media content 214 from a second streaming server. As noted in FIG. 12 below, multiple streaming servers may be displaced along a data path, where the encoded media stream can be generated and forwarded along the data path to client devices (e.g., client devices 114a-c).

Upon receiving data at the network interface 216, the streaming server 110 may determine whether the received data is encoded. If the received data is encoded, the streaming data may be forwarded to a decoder 218. In some embodiments, the received data may be a live stream 212 that is not encoded. In this event, the live stream may be forwarded onto the transcoder 220 to encode the live stream to an encoded media stream using a suitable encoding protocol.

The decoder 218 may be configured to decode a received encoded media stream using a suitable decoding protocol. The decoded media stream may be forwarded to a transcoder 220. The transcoder 220 may encode the received data into an encoded media stream using a suitable encoding protocol.

The encoded media content may be forwarded to network interface 222. Network interface 222 may forward the encoded media content 214 to various client devices over a network via suitable wired and/or wireless communication protocols.

In some embodiments, a network monitor 224 may monitor the decoding and encoding of the received media stream and receive information relating to the decoding and encoding of the media stream. Based on the information received, network monitor 224 may identify an error in the encoded stream.

The network monitor 224 can transmit a request to modify or adjust other components in the streaming server 210 to adjuster 226. Adjuster 226 can adjust/modify a portion of the video stream and/or the transcoder 220. Such adjusting may include modifying a transcoding technique or protocol, for example.

In some embodiments, advertisements 228 are added to the video stream. An advertisement may include video content configured to be supplemented into a video stream. As an example, the streaming server 210 may add advertisements at various points in time to the encoded media stream.

Figure 3:
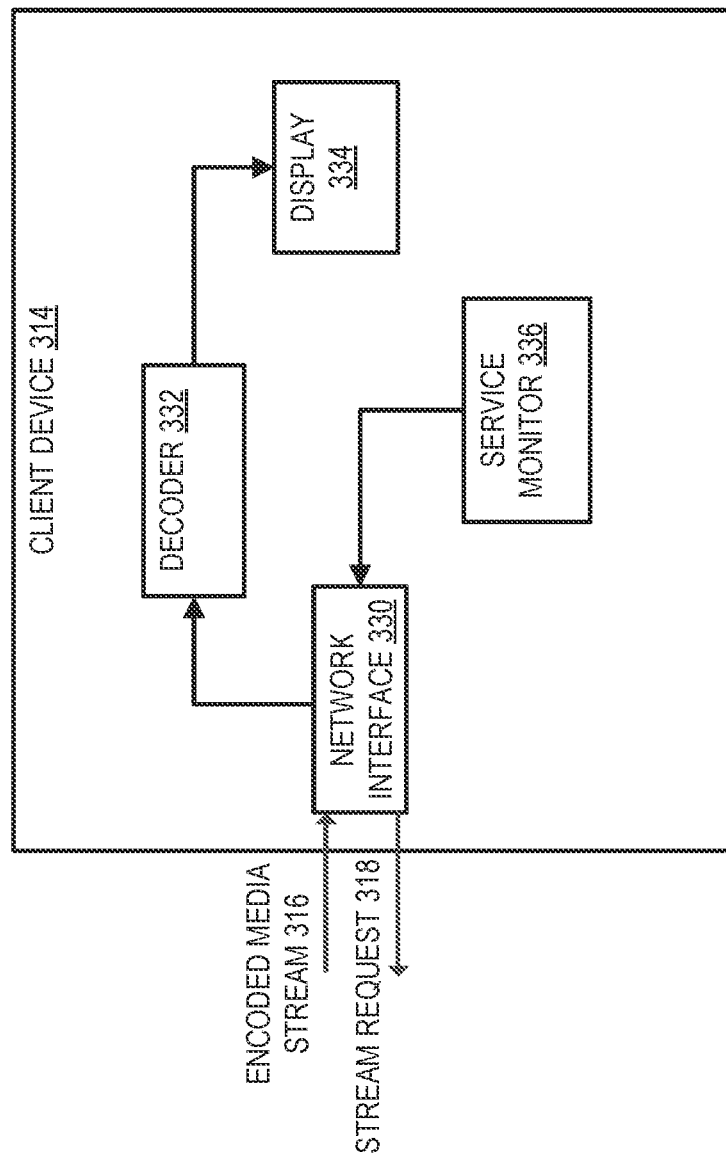
FIG. 3 illustrates an architecture of a client device, in accordance with various embodiments.

FIG. 3 illustrates an architecture of a client device 314, in accordance with various embodiments. Client device 314 may include a network-accessible electronic device, such as a smartphone, computer, tablet, gaming console, smart home device, etc.

As noted above, the client device 314 may transmit a stream request 318 to the streaming server (e.g., streaming server 110 in FIG. 1) via network interface 330 connected to a network, such as the Internet. The stream request 318 may include a request to subscribe to a live video stream and to receive an encoded media stream from the streaming server.

The network interface 330 of the client device 314 may receive an encoded stream 316 from the streaming server.

The encoded media stream 316 may be forwarded to decoder 332. Decoder 332 may decode the encoded media stream and transmit the rendered video/audio content to output components, such as display 334. Other example output components may include a speaker, headset, touchscreen, etc. The display 334 may display an associated video stream with a resolution/definition corresponding to a bitrate of the encoded media stream.

A service monitor 336 may monitor the encoded stream and the decoding of the stream. For example, if there is an error in the decoding of the encoded stream, the service monitor may identify the error or modify the client device based on the error.

Encoded Media Stream Overview

Figure 4:
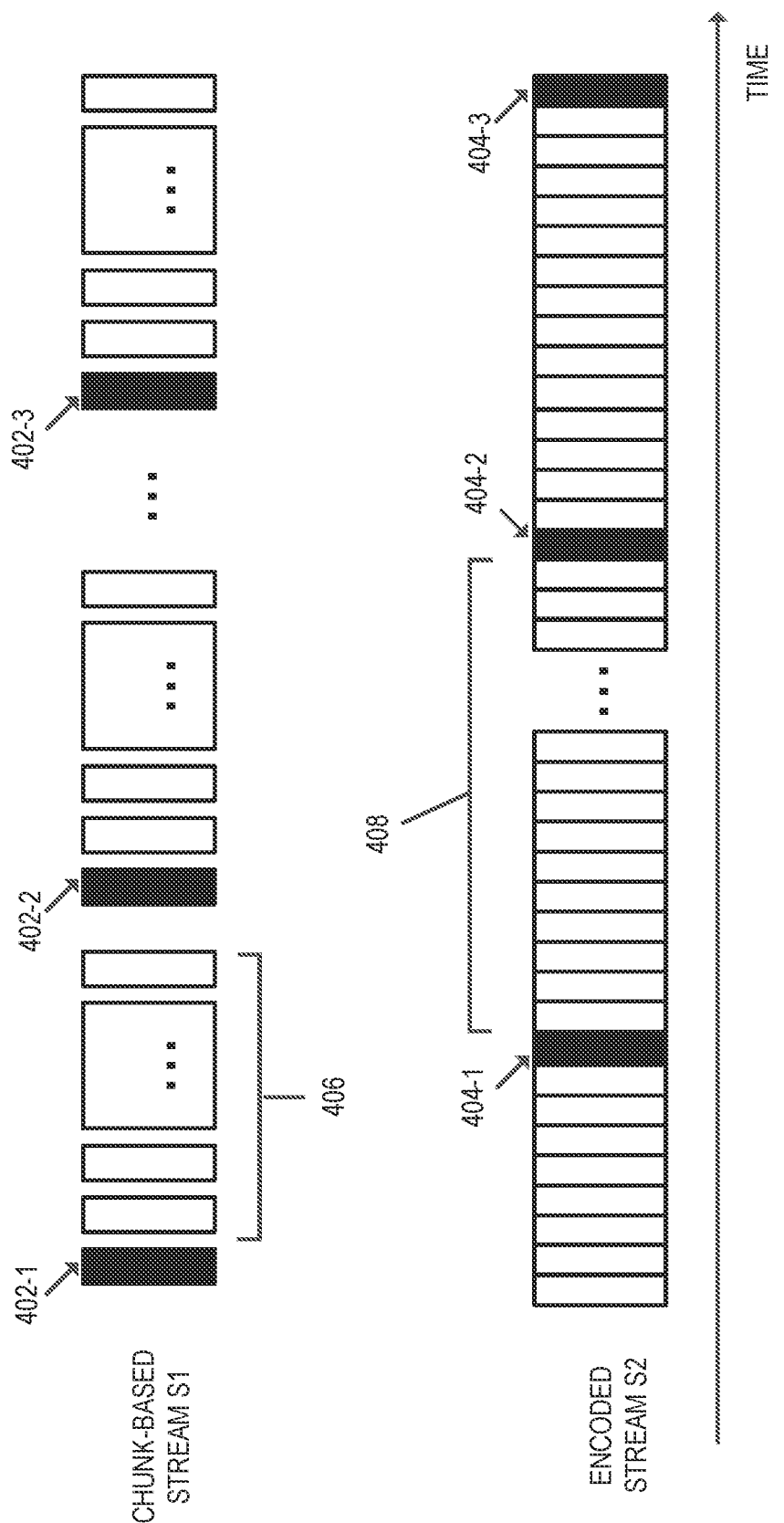
FIG. 4 illustrates an encoded media stream, in accordance with various embodiments.

FIG. 4 illustrates an encoded media stream, in accordance with various embodiments. The encoded media stream (e.g., chunk-based stream S1, encoded stream S2) may include data representing media content, such as a live video stream, for example.

An encoded media stream may include a series of key frames (e.g., key frames 402-1 to 402-3, 404-1 to 404-3) and subsequent prediction frames (e.g., set of prediction frames 406, 408). A key frame (e.g., first key frame 402-1) (or "i-frame") may represent a full frame of the image in a video. As an example, key frames may be similar to intra-frames in VP8 or key frames in MPEG.

In operation, a client device (e.g., client device 314 in FIG. 3) may process a first key frame 402-1, 404-1 to render the corresponding media content, such as a frame of a video. Key frames may be decoded without reference to any other frame in a sequence, where the decoder reconstructs such frames beginning from the decoder's "default" state. In some embodiments, key frames may provide random access (or seeking) points in a video stream.

The encoded media stream may also include a plurality of prediction frames 406, 408 (or "delta frames") succeeding the key frame with respect to time. Prediction frames 406, 408 may represent the differences between the key frame, which may lower the required data to render the frame represented by the predicted frame. As an example, prediction frames 406, 408 may be similar to inter-frames in VP8 or P-frames in MPEG terminology. Prediction frames 406, 408 may be encoded with reference to prior frames, and, in some embodiments, all prior frames may be encoded up to and including the most recent key frame. In many cases, the correct decoding of a predictive frame 406, 408 depends on the correct decoding of the most recent key frame and all ensuing predictive frames. Consequently, the decoding algorithm may not be tolerant of dropped key frames. In an environment in which frames may be dropped or corrupted, correct decoding may not be possible until a key frame is correctly received.

A media stream can be encoded using an encoding technique, such as chunked transfer encoding to create chunks (i.e., divided and non-overlapping portions of the media stream). Chunk-based stream S1 in FIG. 4 may represent an example of a chunk-based stream. Chunks of an encoded media stream may be transmitted and received independently of one another. In some embodiments, both the recipient and the sender of the chunk-based stream may not need to know of the data stream outside of the chunk currently being processed.

Figure 5:
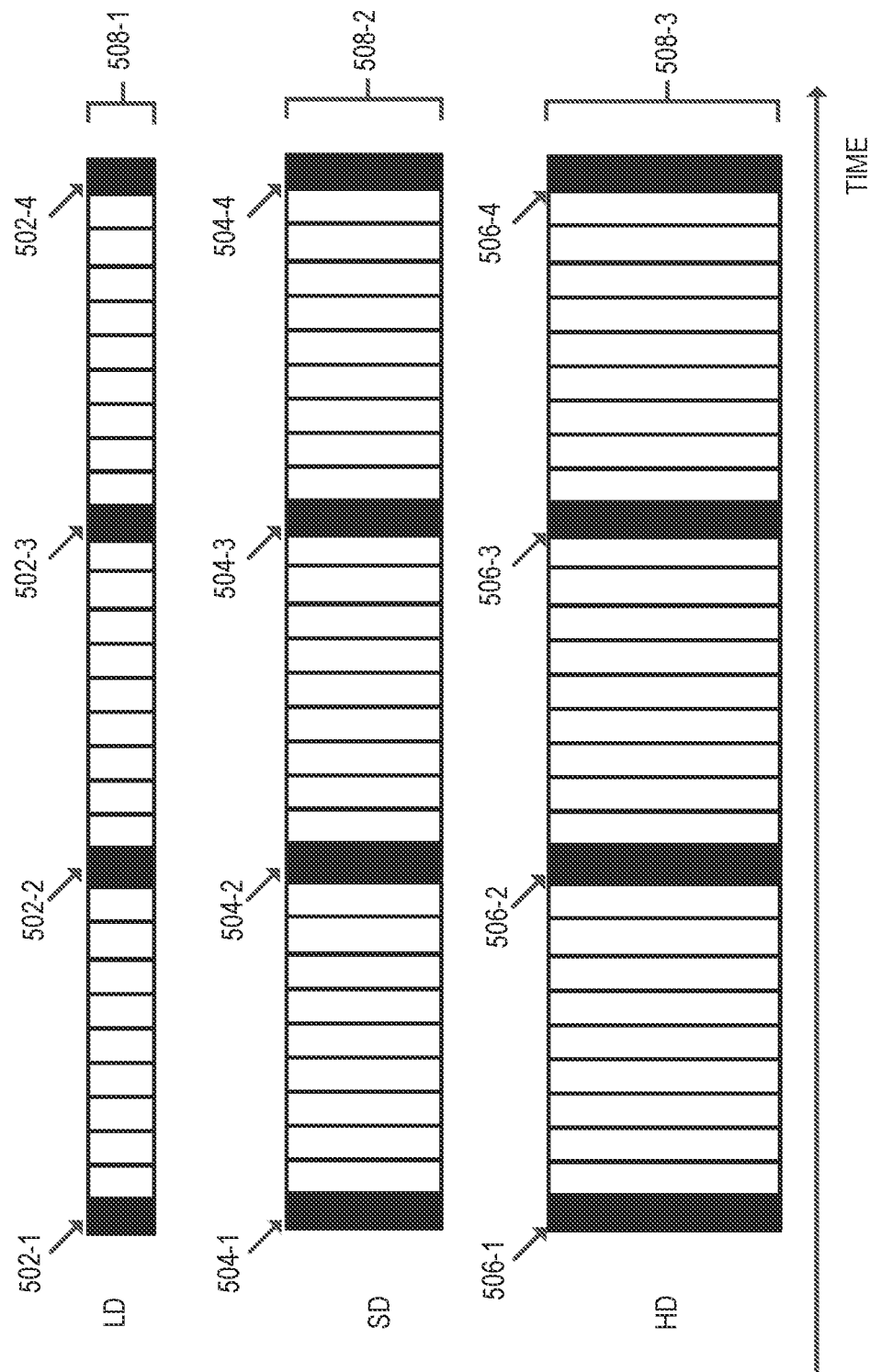
FIG. 5 illustrates an encoded media stream with a set of distribution layers, in accordance with various embodiments.

FIG. 5 illustrates an encoded media stream with a set of distribution layers, in accordance with various embodiments. An encoded media stream may include multiple alternative streams LD, SD, HD, referred to as "distribution layers." As shown in FIG. 5, an encoded media stream may be streamed over multiple bit-rates 508-1, 508-2, 508-3 (or "multi bit-rate (MBR) encoding"). The bit-rate of a distribution layer may represent the number of bits for a frame of video, where a greater bit-rate correlates to a higher definition video. For example, as shown in FIG. 5, a first distribution layer LD may include a low definition bit-rate 508-1, a second distribution layer SD may include a standard definition bit-rate 508-2, and a third distribution layer HD may include a high definition bit-rate 508-3.

In some embodiments, the encoded media content is streamed in segments or chunks (e.g., chunk-based stream as shown in FIG. 4) at various bit (or "coding") rates. In these embodiments, if network conditions change (i.e., data transmission and processing capabilities increase or decrease), the subscribing device may switch between different chunks to subscribe to an alternative version of the encoded media stream with a different bit-rate.

In many cases, MBR encoding uses a constant bit-rate approach to encode each media stream. Utilizing constant bit-rate encoding to encode alternative streams may result in inconsistent and undesirable output quality of the resulting media. For example, a video represented in an encoded media stream includes portions (or "scenes") with a wide variety of visual complexity. In this example, constant bit-rate encoding may be unable to efficiently encode these video segments that include varying quality. This may be because constant bit-rate encoding may have too many bits for encoding low-complexity video segments, leaving insufficient bits for encoding the higher-complexity video segments.

In many cases, MBR encoding requires the final display resolution at the client device to be fixed. With a fixed display resolution, a multi bit-rate video stream can be decoded and scaled to the fixed display resolution to minimize the glitch in the displayed media. With fixed display resolution, various alternative media streams can have a wide range of bit-rates, such as, for example, from a few megabits per second to a few kilobits per second. In these cases, a problem faced with streaming to a fixed display resolution is matching an appropriate video resolution to varying bit-rates of multiple video streams. Many multi bit-rate encoding techniques utilize a pre-defined encoding resolution, which may not be well suited to varying complexity of the video scenes and dynamic network conditions across client devices on different networks.

Figure 6:
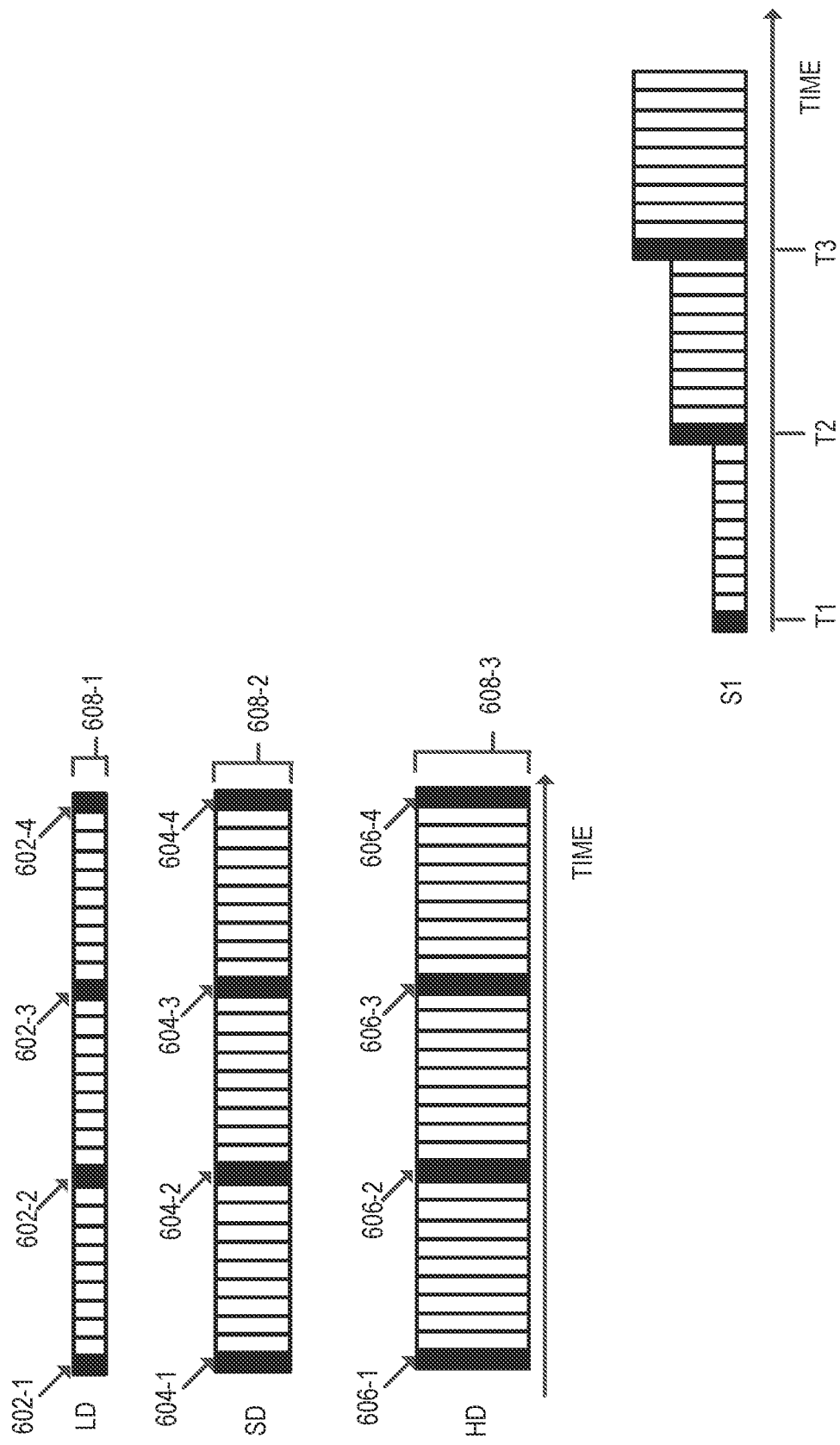
FIG. 6 illustrates an encoded media stream with an adaptive bit-rate, in accordance with various embodiments.

In many cases, encoded media streams may utilize adaptive bit-rate streaming to encode media content at multiple bit-rates. FIG. 6 illustrates an encoded media stream with an adaptive bit-rate, in accordance with various embodiments. With adaptive bit-rate encoded media streams, a client device may switch between streaming the encoded media at various bit-rates based on the available resources. For example, if the client device is capable to stream at a bit-rate with a higher coding rate than a presently streamed bit-rate, the client device may switch to the other bit-rate with the higher coding rate.

In some embodiments, the source media content may be encoded into various distribution layers at various bit-rates and segmented into portions of the media content. The streaming client may be made aware of the available streams at different bit-rates and segment the streams by a manifest file.

For example, upon starting/initializing (at time T1), a client device may subscribe to (or request segments from) a first stream LD with a lower bit-rate 608-1. If the client device determines that it is capable for processing a stream with a higher-bit-rate than the first stream with a lower bit-rate at time T2, the client device may subscribe to a second stream SD with a higher bit-rate 608-2. Similarly, the client device may subscribe to a third stream HD at time T3 upon determining that the client device can process a stream with a higher bit-rate 608-3.

Conversely, if the download speed or processing speed of the client device is lower than the bit-rate of a presently subscribed stream, the client device may subscribe to a lower bit-rate segment. In some embodiments, the client device may subscribe to the lower bit-rate segment based on determining that network throughput has decreased, or processing capability of the client device has decreased below a threshold level.

Figure 7A:
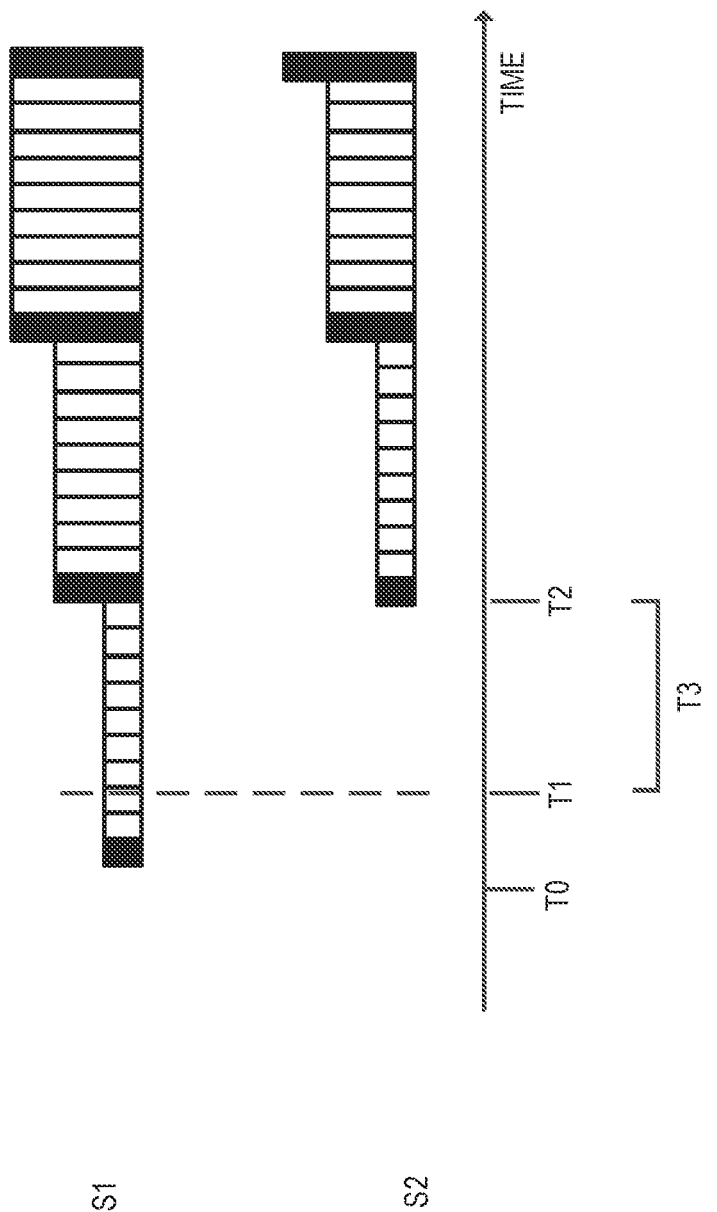
FIG. 7A illustrates an adaptive bit-rate streaming for live broadcasting with multiple subscribers, in accordance with various embodiments.

FIG. 7A illustrates adaptive bit-rate streaming for live broadcasting with multiple subscribers, in accordance with various embodiments. As shown in FIG. 7A, multiple subscribers (e.g., subscribers S1, S2) may subscribe to an encoded media stream. As an example, subscriber 1 S1 may subscribe to the encoded media stream at time T0. Subscriber 2 S2 may subscribe at time T1.

In some embodiments, if the encoded media stream utilizes adaptive bit-rate streaming, each distribution layer of the stream may previously be encoded. However, with live broadcasting, a new client (e.g., subscriber 2 S2) subscribing to the already broadcasting encoded media stream requests a new key frame at a specific resolution (i.e., a distribution layer of the stream associated with the specific resolution). In many cases, the new client S2 may request the encoded media stream at a subscription time before the arrival of a new key frame at time T2 in relation to the time domain. The time period between the subscription time of the new client T1 and the time where the first frame is rendered T2 may include the startup latency T3.

FIG. 7B illustrates adaptive bit-rate streaming for live broadcasting in dynamic network conditions, in accordance with various embodiments. In some embodiments, in response to changing network conditions, a client may request changing the bitrate of an encoded media stream to adapt to the changing network conditions.

As an example, as shown in FIG. 7B, the client may determine that a higher bandwidth is available at a first time T1. Determining that a higher bandwidth is available may include the client identifying that available bandwidth can accommodate processing a higher bit-rate encoded media stream. Accordingly, the client may request to subscribe to a distribution layer with a higher bit-rate to increase the quality of the representative media.

However, to subscribe to a distribution layer with a greater bit-rate, the client may have to wait until a new key frame for the requested distribution layer arrives at time T2. Accordingly, the duration between the first time T1 and time T2 represents a time duration where bandwidth is underutilized T3. This wait time T3 (or "time to first frame") with underutilized bandwidth may result in lower quality of client experience, as the bit-rate of the decoded media is at a lower quality than the quality resulting from the higher bit-rate stream.

Additionally, as shown in FIG. 7B, the client may incur a bandwidth drop at time T4. A bandwidth drop may include the available bandwidth lowering, where a client may be unable to process the encoded media stream at a present bit-rate. In this example, the client may request a lower bit-rate stream, and a new key frame at the lower bit-rate may arrive at a later time (e.g., first key frame time T5). The time duration from the bandwidth drop time T4 and the time of the new key frame T5 may be a render discontinuity time duration T6. During the render discontinuity time, the resulting media may be interrupted/glitching or unable to display the media.

A broadcast group may include a group of client devices subscribed to an encoded media stream. In one case, if one client in the broadcast group is unable to maintain a bit-rate of the encoded media stream, the client may be excluded from the stream or moved to a new broadcast group subscribed to a stream at a lower bit-rate. In a second case, if one client in the broadcast group is unable to maintain a bit-rate of the encoded media stream, the encoded media stream may be lowered to a lower bit-rate so that all clients in a broadcast group are capable of processing the stream at the lower bit-rate. In either case, the overall quality, either to a single client or to the broadcast group, may be lowered.

In some embodiments, optimizing client experience and quality while efficiently utilizing computational and network resources involves multiple steps. A first step may include selecting a quality level at which to encode content such that it can be transferred and reconstructed, uninterrupted, to multiple clients in a broadcast group. A second step may include reducing a time to the first frame for new subscribers to an encoded media stream while preserving its quality in the context of dynamic network conditions.

Shifted Distribution Layers (SDL) for Live Broadcasting

Figure 8A:
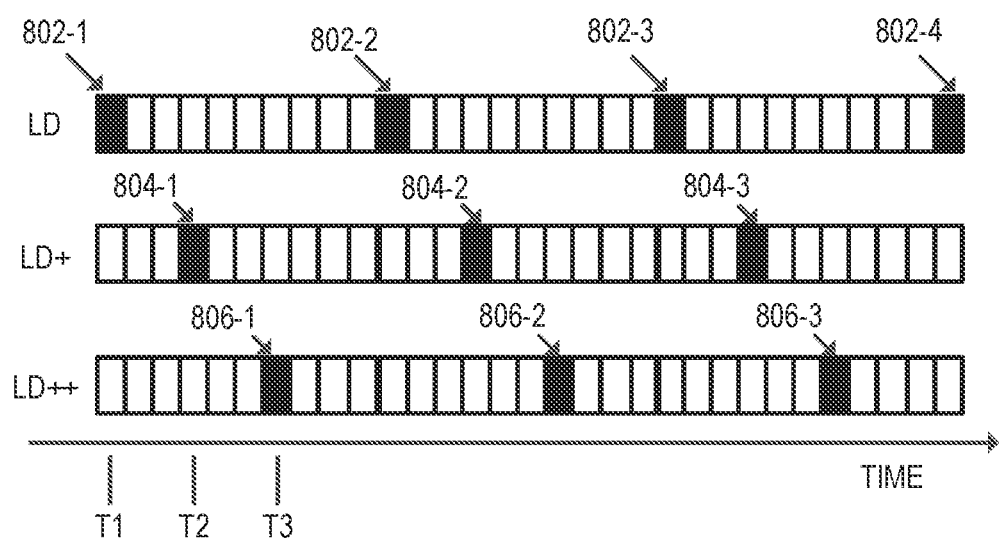
FIG. 8A illustrates a set of encoded media data with shifted distributed layers, in accordance with various embodiments.

FIG. 8A illustrates a set of encoded media data with shifted distributed layers, in accordance with various embodiments. The distribution layers LD, LD+, LD++ of the encoded media stream may include sets of key frames at various positions in time, which may be referred to as a "shifted distributed layer."

As an example, in FIG. 8A, a first distribution layer LD may include a series of key frames 802-1 to 802-4 with the first key frame 802-1 at a first time position T1. A second distribution layer LD+ may include a series of key frames 804-1 to 804-3 shifted with respect to the time domain, with a first key frame 804-1 at a second time position T2. Similarly, a third distribution layer LD++ may include a series of key frames 806-1 to 806-3 shifted with respect to the time domain, with a first key frame 806-1 at a second time position T3. Having alternative versions of the stream, with key frames shifted in time respective to the position of the key frame in the original stream, may reduce startup latency, avoid streaming disruptions, and improve resource utilization under changing network conditions.

Figure 8B:
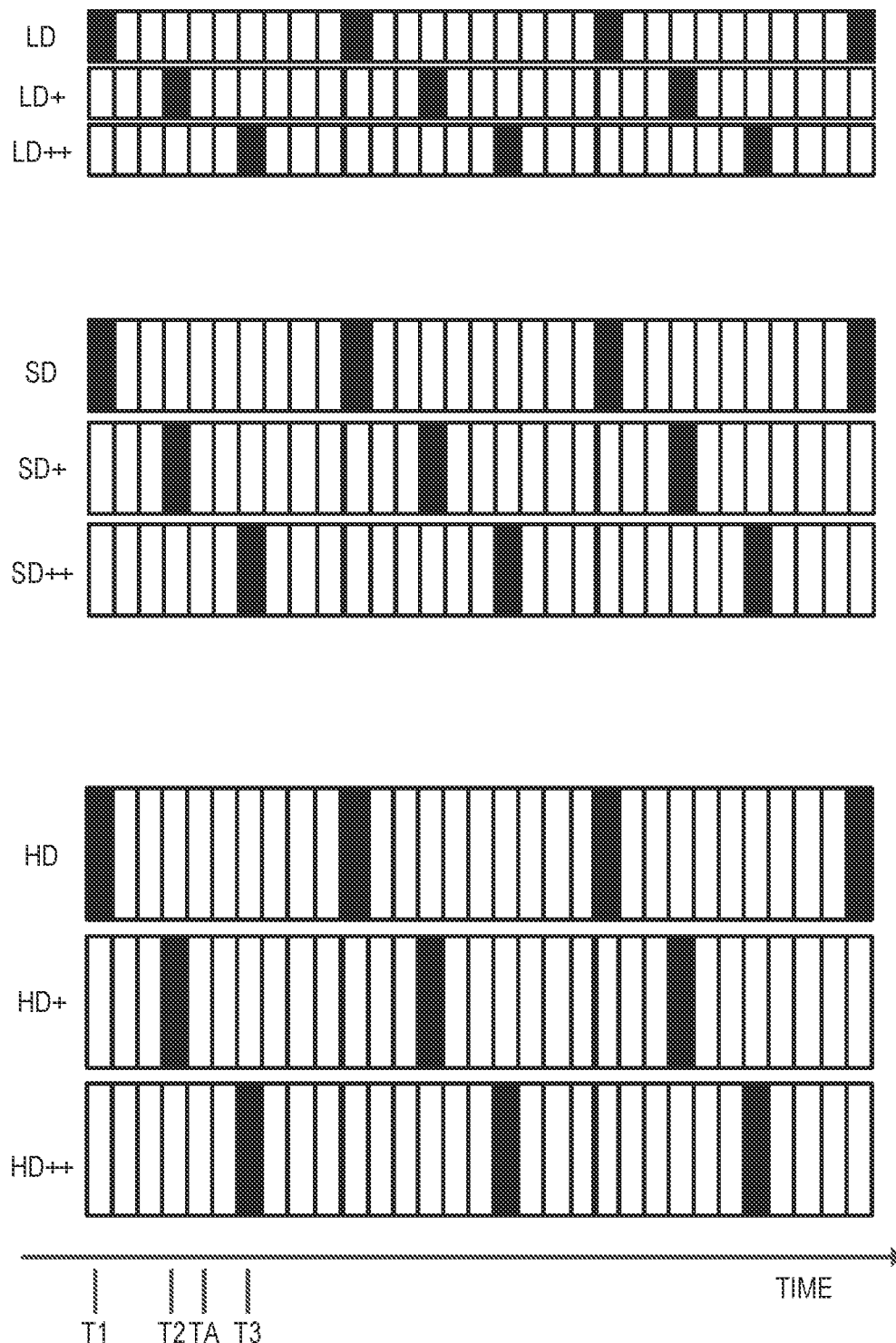
FIG. 8B illustrates a set of encoded media data with shifted distributed layers of multiple bit-rates, in accordance with various embodiments.

FIG. 8B illustrates a set of encoded media data with shifted distributed layers of multiple bit-rates, in accordance with various embodiments. As shown in FIG. 8B, encoded media data may include distribution layers of various bit-rates or coding rates (e.g., LD, SD, HD). Additionally, the encoded media data of distribution layers LD, SD, HD may include a first key frame at a first time T1.

The distribution layers of the encoded media stream may include shifted distribution layers, where the key frames are shifted with respect to the time domain. For example, as shown in FIG. 8, shifted distributed layers LD+, SD+, and HD+ include a first key frame shifted in time at second time T2. Similarly, shifted distributed layers LD++, SD++, and HD++ include a first key frame shifted in time at third time T3. The distribution layers may include key frames shifted in time at any time position relative to the time domain.

Utilizing shifted distribution layers in the encoded media stream may reduce the startup latency, as new subscribers to the encoded media stream can subscribe to a distribution layer with a key frame closest in time to the current subscription time. For example, a new client device may subscribe to the encoded media stream at time TA requesting a distribution layer with an HD bit-rate. In this example, the new client device may subscribe to distribution layer HD++, as the first key frame shifted in time at third time T3 has the shortest distance in time to the current time TA. Accordingly, subscribing to a shifted distribution layer of an encoded data stream may reduce startup latency rather than the new client waiting for a next key frame of an unshifted distribution layer (HD).

Shifted Distribution Layers and Dynamically Generated Layers (DGL)

Figure 9:
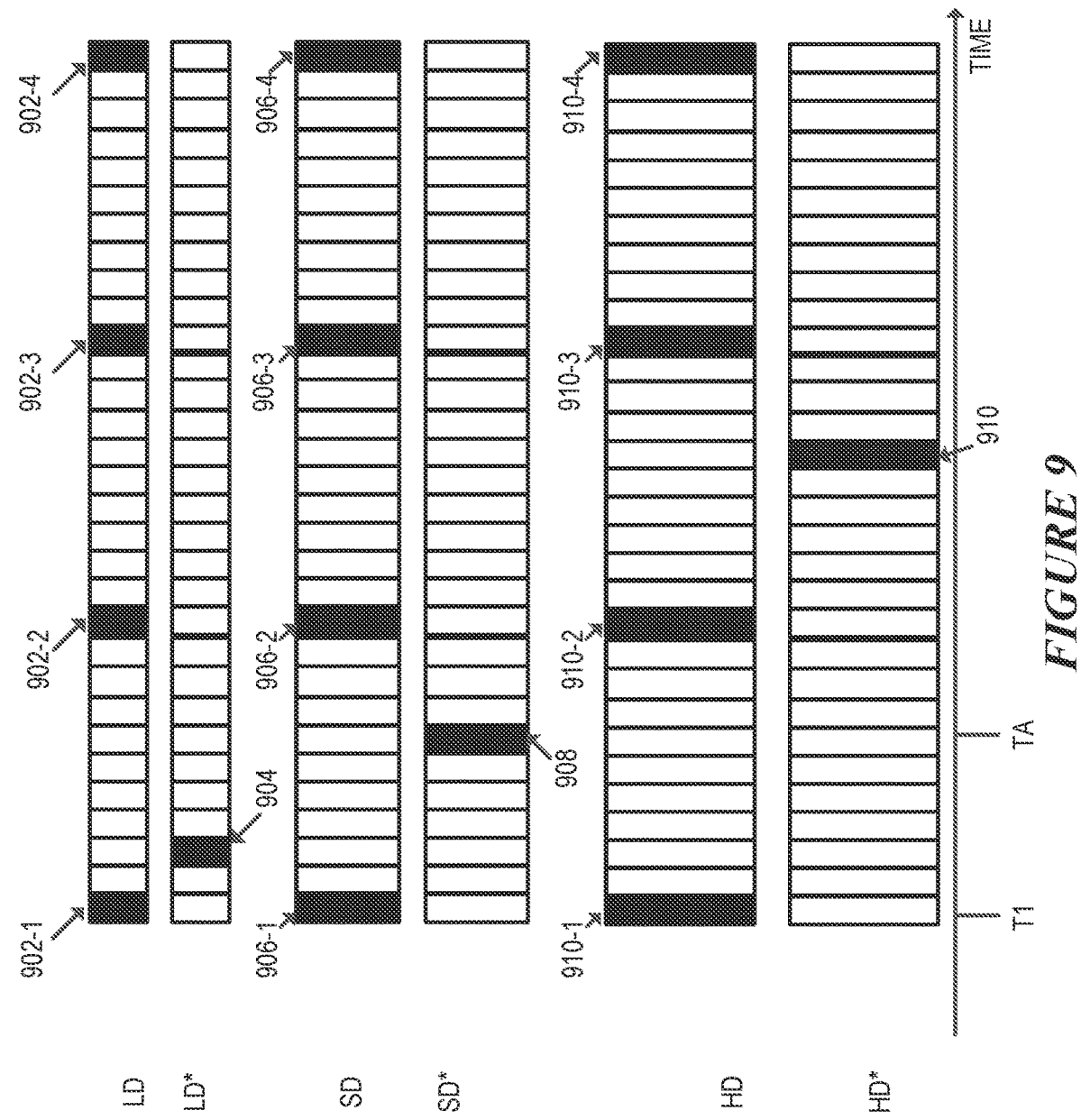
FIG. 9 illustrates encoded streaming data with dynamically generated distribution layers and key frames, in accordance with various embodiments.

In some embodiments, shifted distribution layers and key frames may be dynamically generated. FIG. 9 illustrates encoded streaming data with dynamically generated distribution layers and key frames, in accordance with various embodiments.

A shifted distribution layer may be generated dynamically. As an example, a new client may subscribe to the encoded media stream at a standard definition (SD) coding rate at time TA. However, if the new client subscribed to distributed layer SD at time TA, there may be a startup latency between time TA and the time of the next key frame 906-2. As noted above, startup latency may lower client experience and quality of the resulting media from the encoded media stream.

Furthering the above example, a new distribution layer may be dynamically generated based on determining that the new client has subscribed to the encoded media stream. The dynamically generated layer (DGL) may be represented by SD*, where the dynamically generated key frame of SD* 908 reduces the startup latency between the subscription time TA and the key frame time.

In some embodiments, a new DGL may be generated for a new client subscribing to the encoded media stream to reduce the startup latency. A new DGL may be generated if the time period between a current time (e.g., TA) and a next key frame exceeds a threshold time duration. A threshold time duration may represent a specific number of predictive frames until the next key frame or a time period until the next key frame.

As an example, if the threshold time duration is 5 predictive frames between a current time and the next key frame for a distribution layer (e.g., SD), a DGL (e.g., SD*) may be generated if the duration between the current time and the next key frame for the distribution layer is 7 frames. Conversely, a DGL (e.g., SD*) may not be generated if duration between the current time and the next key frame for the distribution layer is less than the threshold time duration (e.g., 3 frames).

Figure 10:
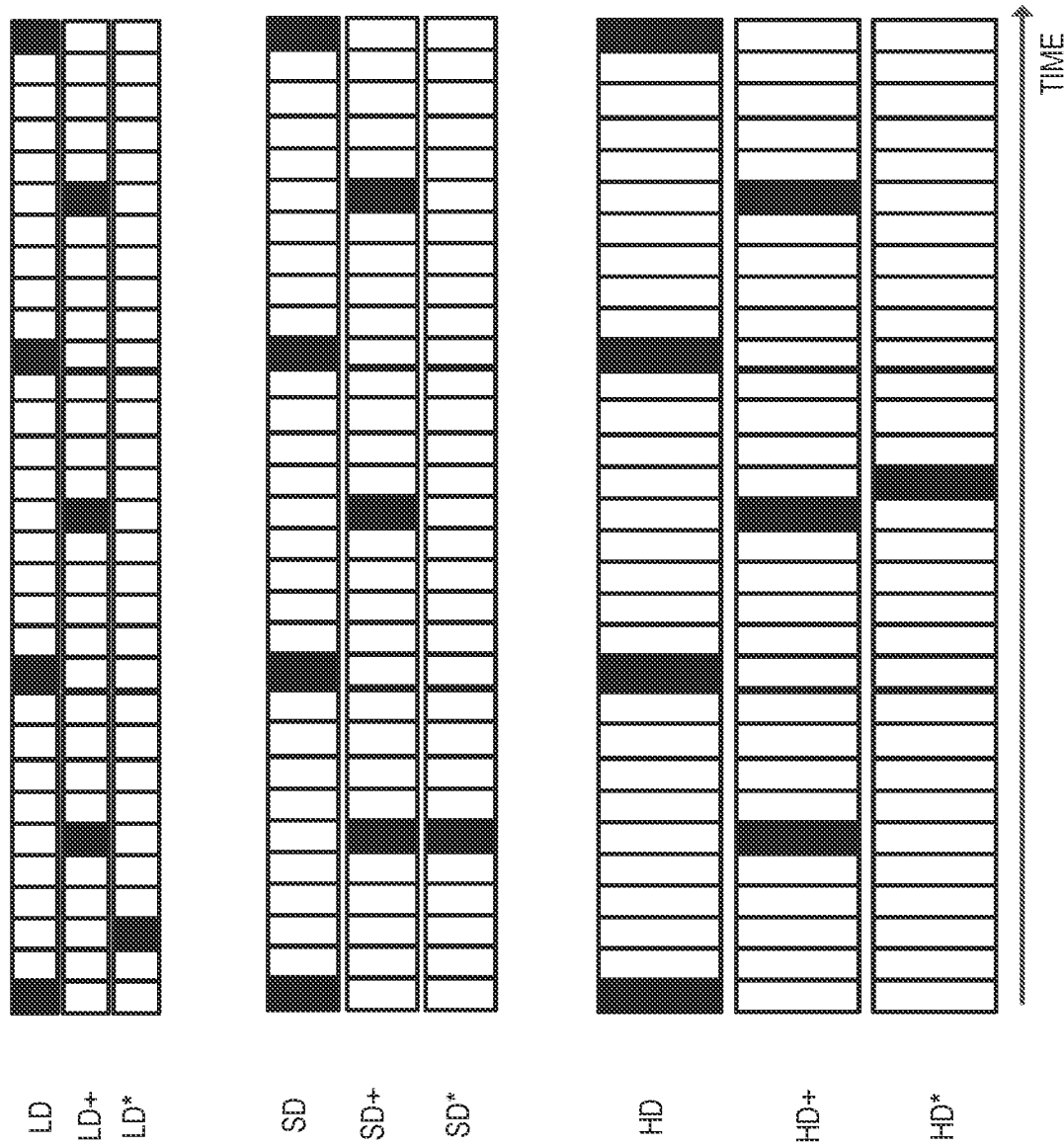
FIG. 10 illustrates a set of distribution layers and dynamically generated layers for an encoded media stream, in accordance with various embodiments.

FIG. 10 illustrates a set of distribution layers and dynamically generated layers for an encoded media stream, in accordance with various embodiments. In the embodiment as illustrated in FIG. 10, layers LD*, SD*, and HD* may be dynamically generated layers (DGLs) of various bit-rates. Utilizing shifted distribution layers and DGLs may improve the quality of experience for stream subscribers and reduce resource demand.

As an example, a new DGL for an identified bit-rate may be dynamically generated based on any of a new client subscribing to the encoded media stream or a client experiencing changing network conditions. In some embodiments, a streaming server may generate the dynamically generated layers or the shifted distribution layers based on either detecting a changing network condition for a client device or receiving a message from a client device indicating a change in network conditions.

Distribution Layers and Associated Bridge Distribution Layers (BDL)

Figure 11:
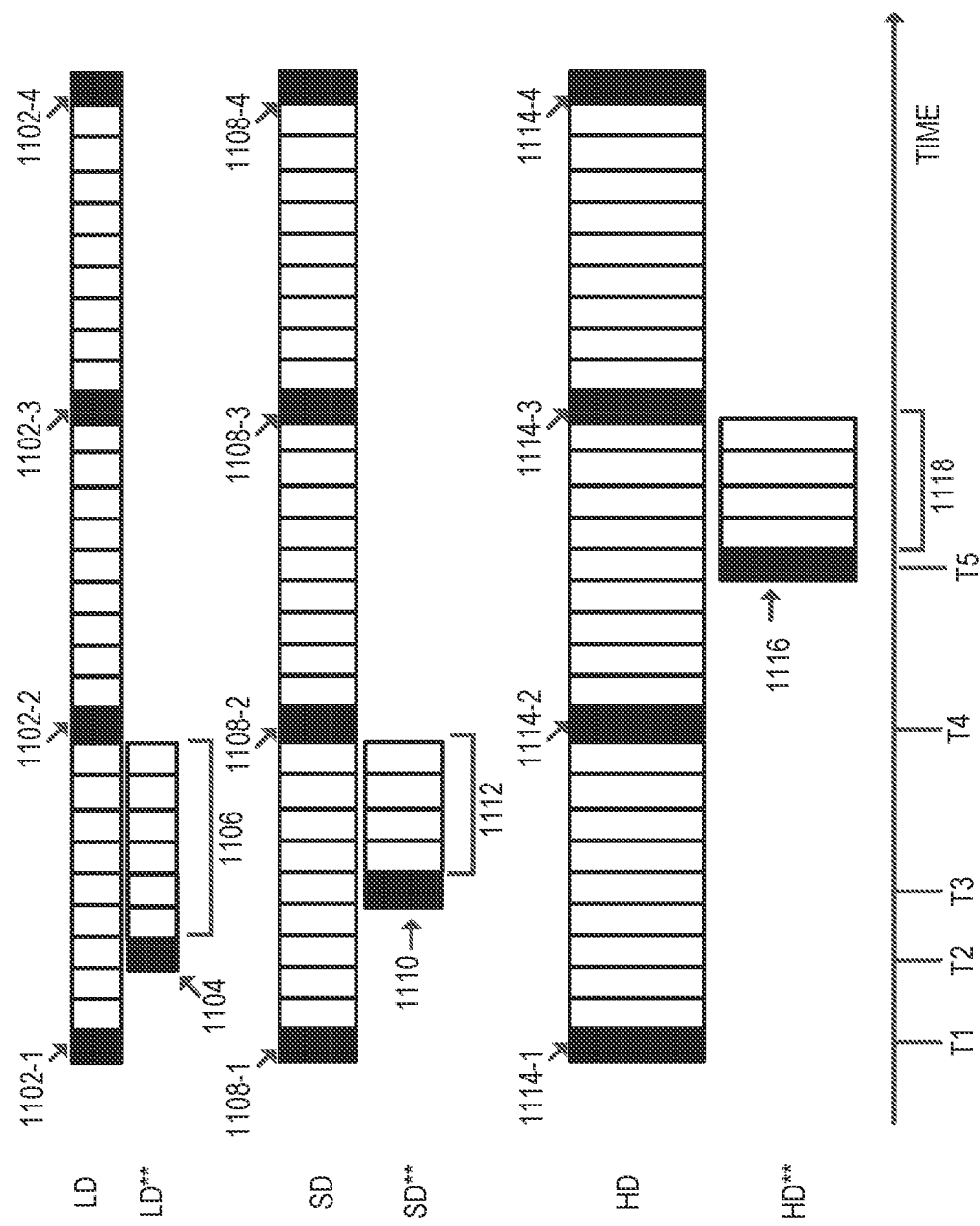
FIG. 11 illustrates a set of distribution layers and bridge distribution layers for an encoded media stream, in accordance with various embodiments.

FIG. 11 illustrates a set of distribution layers and bridge distribution layers for an encoded media stream, in accordance with various embodiments. As shown in FIG. 11, layers LD, SD, and HD may represent distribution layers for the encoded media stream, and layers LD, SD, and HD** may represent bridge distribution layers for the encoded media stream.

A bridge distribution layer (BDL) may include a dynamically generated distribution layer with a finite number of frames. A BDL (e.g., LD, SD, HD) can include a key frame and a number of prediction frames between a current time and the next key frame for a distribution layer. As an example, SD may be generated at time T3, where the BDL includes a key frame 1110 at time T3 and a number of predictive frames 1112 from the key frame to a time of a next key frame for a corresponding distribution layer (SD).

If a client subscribes to a BDL (e.g., SD), the client may switch to the corresponding distribution layer (e.g., HD) when the time matches the time for the next key frame (e.g., T4). In some embodiments, the BDL (e.g., HD) may be abandoned at time T4 upon a client device switching from the BDL.

In some embodiments, the streaming server may stop generating predictive frames for a BDL based on a triggering event. One such triggering event may include the key frame for a corresponding distribution layer arriving, where the streaming server can stop generating the predictive frames at the time of the key frame for the corresponding distribution layer. A second triggering event may include predicting/estimating the time duration between a current time (e.g., T3) and a time for the next key frame (e.g., T4). Based on the estimated time duration, the streaming server may generate the appropriate number of predictive frames after the key frame for the BDL.

Figure 12A:
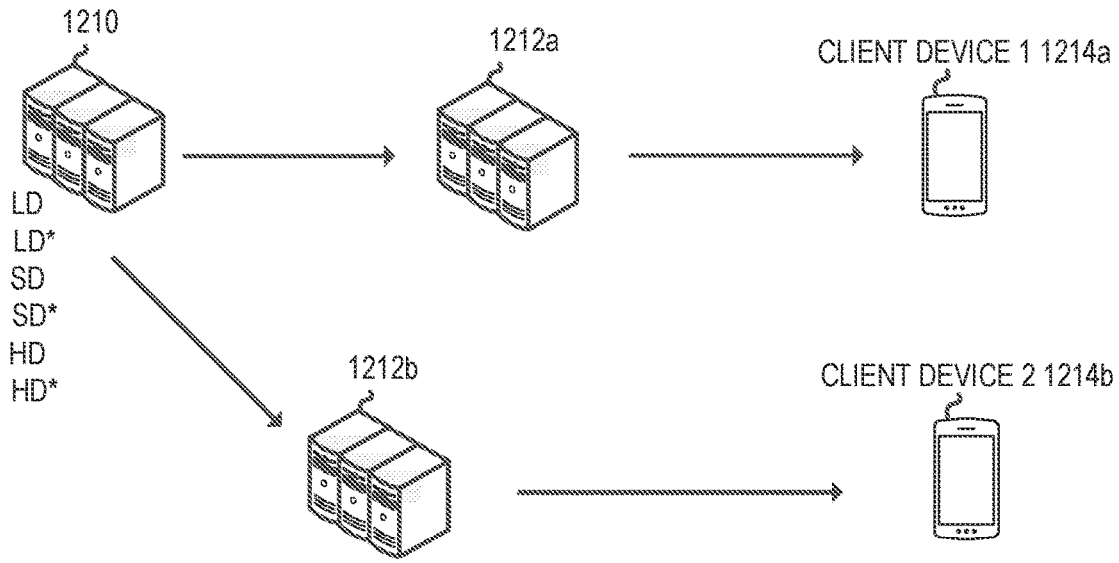
FIG. 12A illustrates an architecture for dynamically generating distribution layers at a source streaming server, in accordance with various embodiments.

FIG. 12A illustrates an architecture for dynamically generating distribution layers at a source streaming server, in accordance with various embodiments. An architecture may include one or more servers that assist in forwarding encoded media streams to client devices. As shown in FIG. 12A, a source streaming server 1210 may transmit an encoded media stream to a client device over a network via an intermediate streaming server 1212a-b.

In the embodiment as shown in FIG. 12A, a source streaming server 1210 may generate encoded media streams with both distribution layers LD, SD, HD and shifted distribution layers LD+, SD+, HD+. The encoded media streams may be transmitted to various intermediate streaming servers 1212a-b and forwarded on to various client devices 1214a-b as part of a broadcast group. This configuration allows for lower demand on resources in generating the encoded media stream distribution layers while lowering a quality of experience. The quality of experience may lessen due to a longer waiting time for client devices in waiting for a next key frame for a distribution layer.

Figure 12B:
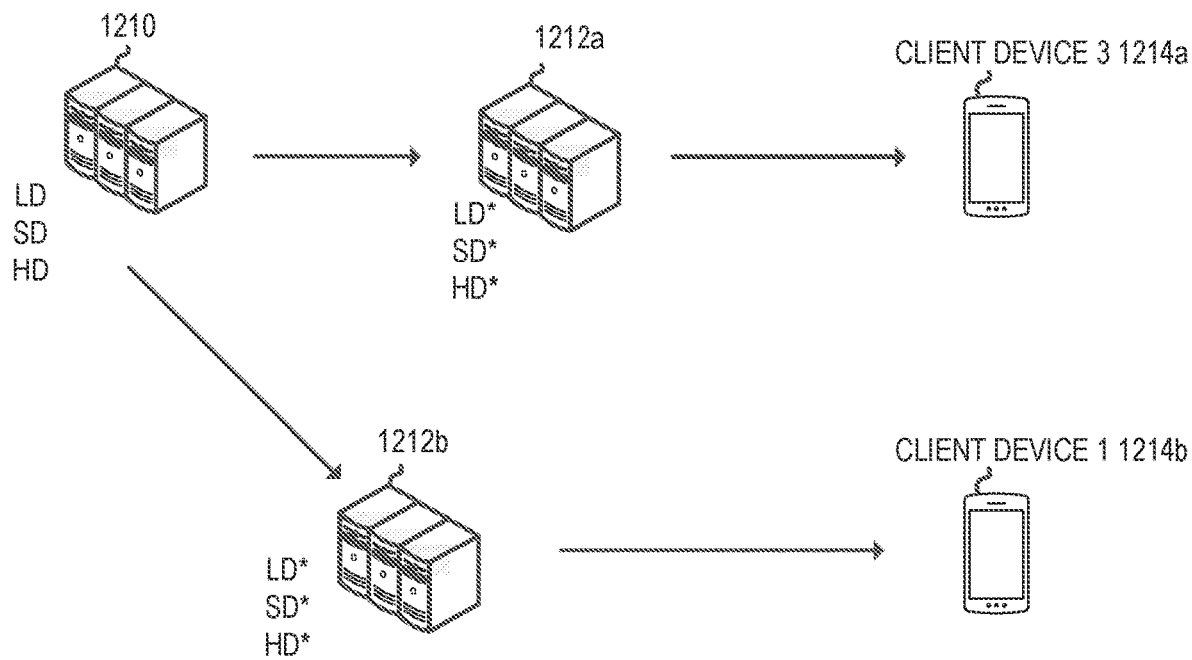
FIG. 12B illustrates an architecture for dynamically generating distribution layers along a data path, in accordance with various embodiments.

FIG. 12B illustrates an architecture for dynamically generating distribution layers along a data path, in accordance with various embodiments. As shown in FIG. 12B, the source streaming server 1210 may generate the encoded media stream with distribution layers LD, SD, HD. An intermediate streaming server 1212a-b may receive the encoded media stream and forward the stream to client devices 1214a-b. In some embodiments, the intermediate client device 1212a-b may generate shifted distributed layers LD+, SD+, HD+ and transmit the shifted distributed layers to client devices 1214a-b. The intermediate client device 1212a-b may transmit the shifted distributed layers to client devices 1214a-b based on receiving a request for shifted distributed layers due to changing network conditions or that the client device is a new subscriber.

Allowing for multiple intermediate streaming servers to dynamically generate shifted distribution layers for client devices may result in a shorter time from the current time to the first frame for client devices. Additionally, multiple encoders may run at each end of the data path in addition to the source streaming server.

Figure 13:
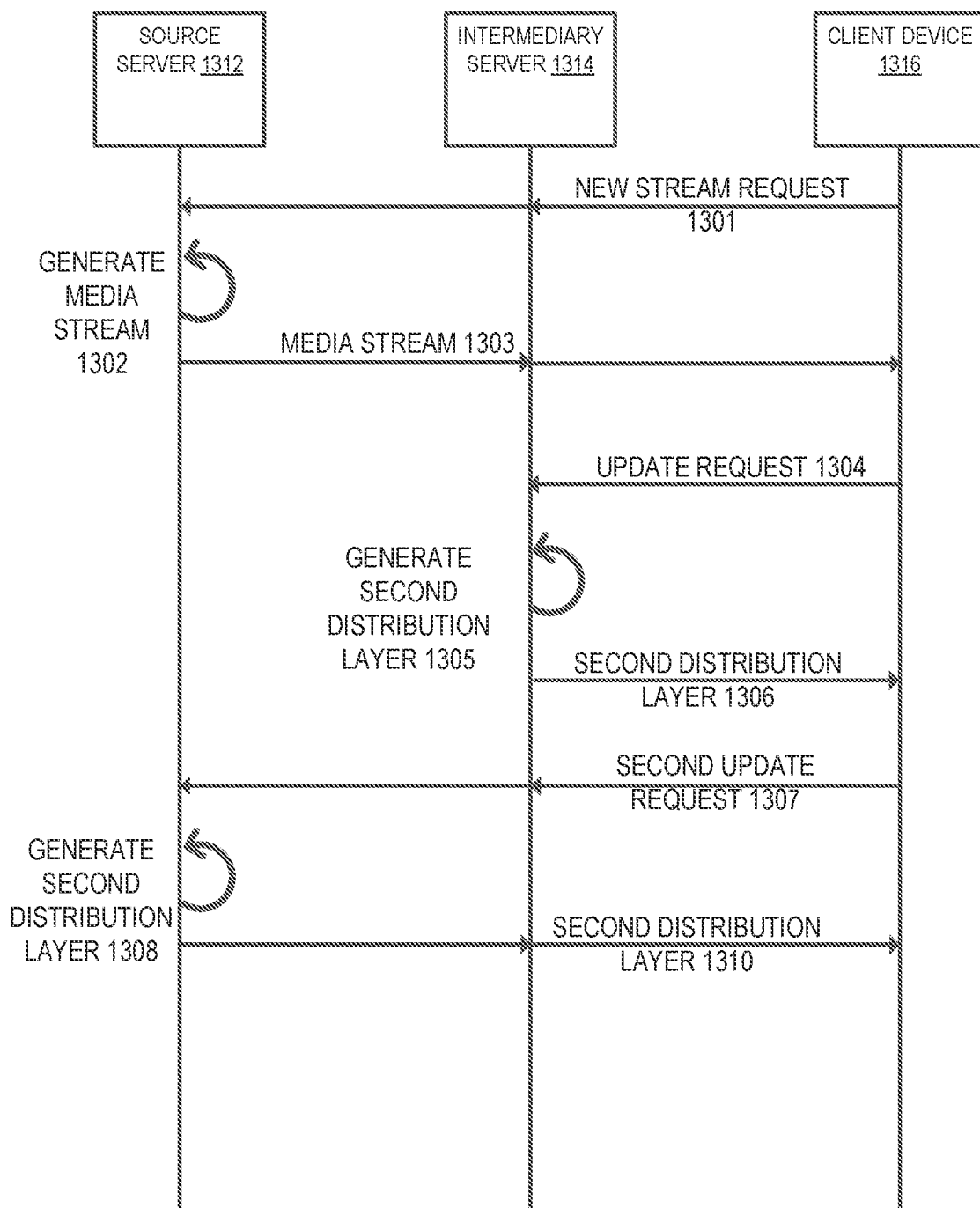
FIG. 13 illustrates signaling process for maintaining continuity of a media stream, in accordance with various embodiments.

FIG. 13 illustrates a signaling process for maintaining continuity of a media stream, in accordance with various embodiments. As shown in FIG. 13, one or more servers (e.g., source server 1312 and intermediate server 1314) can transmit an encoded live media stream to a client device 1316 along a data path.

Client device 1316 can transmit a new stream request 1301 along the data path to an intermediary server 1314. The new stream request 1301 can represent a request to subscribe to a live media stream. Upon receipt of the new stream request 1301, the intermediary server 1314 can forward the request 1301 along the data path to source server 1312.

The source server 1312 may generate a live media stream 1302. In some embodiments, the source server 1312 may generate the media stream at one or more bit-rates based on the new stream request 1301. Source server 1312 may transmit the media stream 1303 to multiple client devices in a broadcast group (e.g., client device 1316). In some embodiments, the source server 1312 can transmit the media stream 1303 along a data path to an intermediary server 1314, where the intermediary server 1314 may forward the media stream 1303 to client device 1316. Upon receipt of the media stream 1303, the client device 1316 can process and render the associated live media content.

In some embodiments, the client device 1316 can transmit and update request 1304 to intermediary server 1314. The update request 1304 can represent a request for a new distribution layer of the media stream at a different bit-rate. For example, the client device 1316 can determine that it can process the media stream at a higher bit-rate. As another example, the client device 1316 can determine that it can no longer process the media stream at that current bit-rate without experiencing glitching or interruption of the media stream.

In some embodiments, the intermediary server 1314 can generate a second distribution layer 1305 upon receipt of the update request 1304 from client device 1316. The second distribution layer 1305 can include a bit-rate specified in the update request 1304 that is different than a bit-rate of the media stream 1303 originally transmitted to client device 1316. Upon generation of the second distribution layer 1305, the intermediary server 1314 can transmit the second distribution layer 1306 to the client device 1316. The second distribution layer 1306 can include a key frame that is shifted in time with respect to a key frame of the first distribution layer in the media stream.

In some embodiments, the client device 1316 may send an update request 1307 on the data path to intermediary server 1314, where intermediary server 1314 may forward this request 1307 to source server 1312. In response to receiving the request 1307, the source server 1312 can generate the second distribution layer 1308. The source server 1312 can transmit a second distribution layer 1310 along the data path to intermediary server 1314, were the intermediary server 1314 may forward the second distribution layer 1310 to client device 1316.

Processing System

Figure 14:
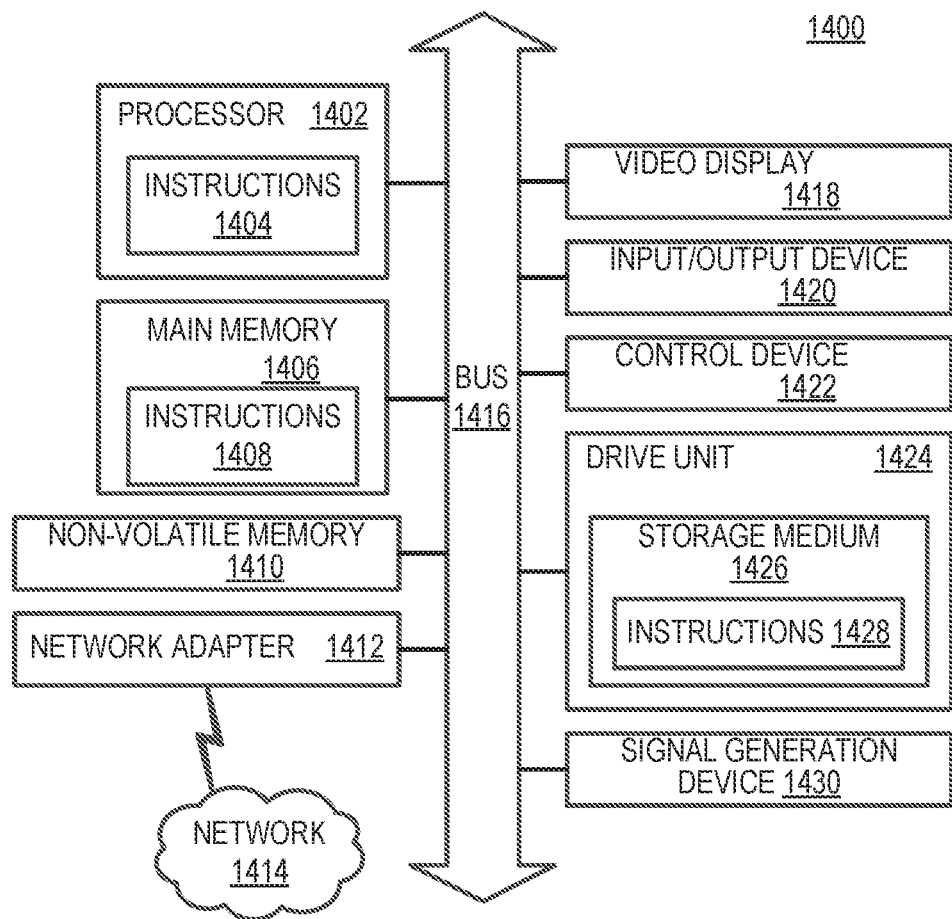
FIG. 14 is a block diagram that illustrates an example of a processing system in which at least some operations described herein can be implemented.

FIG. 14 is a block diagram illustrating an example of a processing system 1400 in which at least some operations described herein can be implemented. For example, some components of the processing system 1400 may be hosted on a streaming server (e.g., streaming server 210 in FIG. 2) or a client device (e.g., client device 314 in FIG. 3).

The processing system 1400 may include one or more central processing units ("processors") 1402, main memory 1406, non-volatile memory 1410, network adapters 1412 (e.g., network interface), video displays 1418, input/output devices 1420, control devices 1422 (e.g., keyboard and pointing devices), drive units 1424 including a storage medium 1426, and signal generation devices 1430 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus (i.e., "Firewire").

The processing system 1400 may share a similar computer processor architecture as that of a desktop computer, tablet computer, personal digital assistant (PDA), smartphone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the processing system 1400.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in a computing device. When read and executed by the one or more processors 1402, the instruction(s) cause the processing system 1400 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1410, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1412 enables the processing system 1400 to mediate data in a network 1414 with an entity that is external to the processing system 1400 through any communication protocol supported by the processing system 1400 and the external entity. The network adapter 1412 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1412 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

In some embodiments, any suitable encoding protocol may be utilized. For example, encoding protocols H.264 or VP9 may be utilized and can apply to any combination of such protocols.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
    obtaining a live media stream including a first distribution layer, wherein the first distribution layer includes a first set of key frames and, for each of a plurality of key frames in the first set of key frames, a first set of delta frames succeeding the key frame until a next key frame in the first set of key frames;
    receiving an indication to change a rendering of the live media stream by a client device;
    responsive to receiving the indication, communicating a second distribution layer of the live media stream to the client device, the second distribution layer including a second set of key frames and, for each of a plurality of key frames in the second set of key frames, a second set of delta frames succeeding the key frame, wherein the second set of key frames contains fewer key frames than the first set of key frames; and
    enabling the client device to maintain continuity of the live media stream by switching from rendering one of the first sets of delta frames of the first distribution layer to rendering the second distribution layer beginning at a selected key frame in the second set of key frames and continuing to the second set of delta frames that follows the selected key frame.

2. The method of claim 1, further comprising:
    generating, by a source server, the first distribution layer; and
    generating, by the source server, the second distribution layer based on receiving the indication to change the rendering of the live media stream from the client device.

3. The method of claim 1, wherein obtaining the live media stream comprises:
    receiving, by an intermediary server, the first distribution layer from a source server, where the first distribution layer is generated by the source server;
    generating, by the intermediary server, the second distribution layer based on receiving the indication to change the rendering of the live media stream from the client device; and
    communicating, by the intermediary server, both the first distribution layer and the second distribution layer to the client device.

4. The method of claim 1, wherein the first distribution layer includes a first bit-rate and the second distribution layer includes a second bit-rate different than the first bit-rate.

5. The method of claim 1, further comprising generating the second distribution layer based on a determination that the client device is a new subscriber to the live media stream.

6. The method of claim 5, wherein generating the second distribution layer comprises:
    determining that a time duration between a time of subscription by the client device to the live media stream and a time of a next key frame in the first set of key frames is greater than a threshold time duration; and
    generating the second distribution layer in response to determining the time duration is greater than the threshold time duration.

7. A device for streaming live media content, the device comprising:
    a memory that includes instructions for maintaining continuity of a live media stream, wherein the instructions, when executed by a processor, cause the processor to:
        obtain a live media stream including a first distribution layer, wherein the first distribution layer includes a first set of key frames and, for each of a plurality of key frames in the first set of key frames, a first set of delta frames succeeding the key frame until a next key frame in the first set of key frames;
        receive an indication to change a rendering of the live media stream by a client device;
        generate a second distribution layer of the live media stream to the client device, the second distribution layer including a second set of key frames and, for each of a plurality of key frames in the second set of key frames, a second set of delta frames succeeding the key frame, wherein the second set of key frames contains fewer key frames than the first set of key frames; and
        communicate the live media stream including the second distribution layer to the client device.

8. The device of claim 7, wherein the instructions further cause the processor to:
    receive live streaming data from an originating client device; and
    encode the live streaming data to generate the live media stream that includes the first distribution layer and the second distribution layer.

9. The device of claim 7, wherein the instructions further cause the processor to:
    receive the first distribution layer from a source device.

10. The device of claim 7, wherein obtaining the live media stream comprises:
    receiving, by an intermediary server, the first distribution layer from a source server, where the first distribution layer is generated by the source server;
    generating, by the intermediary server, the second distribution layer based on receiving the indication to change the rendering of the live media stream from the client device; and
    communicating, by the intermediary server, both the first distribution layer and the second distribution layer to the client device.

11. The device of claim 7, wherein the first distribution layer includes a first bit-rate and the second distribution layer includes a second bit-rate different than the first bit-rate.

12. The device of claim 7, further comprising generating the second distribution layer based on a determination that the client device is a new subscriber to the live media stream.

13. The device of claim 7, wherein generating the second distribution layer comprises:
    determining that a time duration between a time of subscription by the client device to the live media stream and a time of a next key frame in the first set of key frames is greater than a threshold time duration; and generating the second distribution layer in response to determining the time duration is greater than the threshold time duration.

14. A non-transitory computer readable storage medium storing computer program instructions, the computer program instructions when executed by a processor causing the processor to:

obtain a live media stream including a first distribution layer, wherein the first distribution layer includes a first set of key frames and, for each of a plurality of key frames in the first set of key frames, a first set of delta frames succeeding the key frame until a next key frame in the first set of key frames;

receive an indication to change a rendering of the live media stream by a client device; and responsive to receiving the indication, communicate a second distribution layer of the live media stream to the client device, the second distribution layer including a second set of key frames and, for each of a plurality of key frames in the second set of key frames, a second set of delta frames succeeding the key frame, wherein the second set of key frames contains fewer key frames than the first set of key frames, and wherein a selected key frame in the second set of key frames enables the client device to switch from rendering one of the first set of delta frames of the first distribution layer to rendering the second distribution layer beginning at the selected key frame.

15. The non-transitory computer readable storage medium of claim 14, wherein the instructions further cause the processor to:

receive live streaming data from an originating client device; and encode the live streaming data to generate the live media stream that includes the first distribution layer and the second distribution layer.

16. The non-transitory computer readable storage medium of claim 14, wherein the computer program instructions further cause the processor to:

generating, by a source server, the first distribution layer; and generating, by the source server, the second distribution layer based on receiving the indication to change the rendering of the live media stream from the client device.

17. The non-transitory computer readable storage medium of claim 14, wherein obtaining the live media stream comprises:

receiving, by an intermediary server, the first distribution layer from a source server, where the first distribution layer is generated by the source server;

generating, by the intermediary server, the second distribution layer based on receiving the indication to change the rendering of the live media stream from the client device; and communicating, by the intermediary server, both the first distribution layer and the second distribution layer to the client device.

18. The non-transitory computer readable storage medium of claim 14, wherein the first distribution layer includes a first bit-rate and the second distribution layer includes a second bit-rate different than the first bit-rate.

19. The non-transitory computer readable storage medium of claim 14, further comprising generating the second distribution layer based on a determination that the client device is a new subscriber to the live media stream.

20. The non-transitory computer readable storage medium of claim 19, wherein generating the second distribution layer comprises:

determining that a time duration between a time of subscription by the client device to the live media stream and a time of a next key frame in the first set of key frames is greater than a threshold time duration; and generating the second distribution layer in response to determining the time duration is greater than the threshold time duration.

\* \* \* \* \*